(12) United States Patent
Yoshikawa et al.

(10) Patent No.: US 8,402,251 B2
(45) Date of Patent: Mar. 19, 2013

(54) SELECTING CONFIGURATION MEMORY ADDRESS FOR EXECUTION CIRCUIT CONDITIONALLY BASED ON INPUT ADDRESS OR COMPUTATION RESULT OF PRECEDING EXECUTION CIRCUIT AS ADDRESS

(75) Inventors: Takashi Yoshikawa, Kanagawa (JP); Shigehiro Asano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 830 days.

(21) Appl. No.: 12/544,122

(22) Filed: Aug. 19, 2009

(65) Prior Publication Data

US 2010/0122071 A1 May 13, 2010

(30) Foreign Application Priority Data

Nov. 12, 2008 (JP) ................................. 2008-289397

(51) Int. Cl.
*G06F 9/38* (2006.01)
(52) U.S. Cl. .......................................... 712/17; 712/226
(58) Field of Classification Search .................. None
See application file for complete search history.

(56) References Cited

U.S. PATENT DOCUMENTS

| 6,349,346 | B1 * | 2/2002 | Hanrahan et al. ................. 710/9 |
| 6,457,116 | B1 * | 9/2002 | Mirsky et al. ................... 712/16 |
| 2001/0018733 | A1 | 8/2001 | Fujii et al. | |
| 2007/0245131 | A1 | 10/2007 | Yoshikawa et al. | |
| 2009/0037674 | A1 | 2/2009 | Yoshikawa et al. | |
| 2010/0189166 | A1 * | 7/2010 | Mori ............................ 375/219 |

FOREIGN PATENT DOCUMENTS

| JP | 2007-257549 | 10/2007 |
| JP | 2008-530642 | 8/2008 |
| WO | WO 2006-082091 A2 | 8/2006 |

OTHER PUBLICATIONS

Veredas, F. J. et al., "Custom Implementation of the Coarse-Grained Reconfigurable ADRES Architecture for Multimedia Purposes," IEEE. International Conference on Field Programmable Logic and Applications, pp. 106-111, (2005).
Sueyoshi et al., "Reconfigurable Systems," Ohmsha Ltd., NEC Electronics Corporation, pp. 189-194, (2005).
Notice of Rejection issued by the Japanese Patent Office on Jan. 8, 2013, for Japanese Patent Application No. 2008-289397, and English-language translation thereof.

* cited by examiner

*Primary Examiner* — Kenneth Kim
(74) *Attorney, Agent, or Firm* — Finnegan, Henderson, Farabow, Garrett & Dunner, L.L.P.

(57) ABSTRACT

A semiconductor device includes a first circuit that executes a first calculation, a second circuit that includes a first storage unit therein and executes a second calculation, a controller that outputs a first address for specifying a first execution circuit for the first calculation and a second execution circuit for the second calculation, to the first circuit and the second circuit, and controls input of data into the first circuit, and a bus that transfers a result of the first calculation executed by the first circuit to the second circuit, wherein the result of the first calculation can be conditionally used as an address for specifying the second execution circuit.

8 Claims, 11 Drawing Sheets

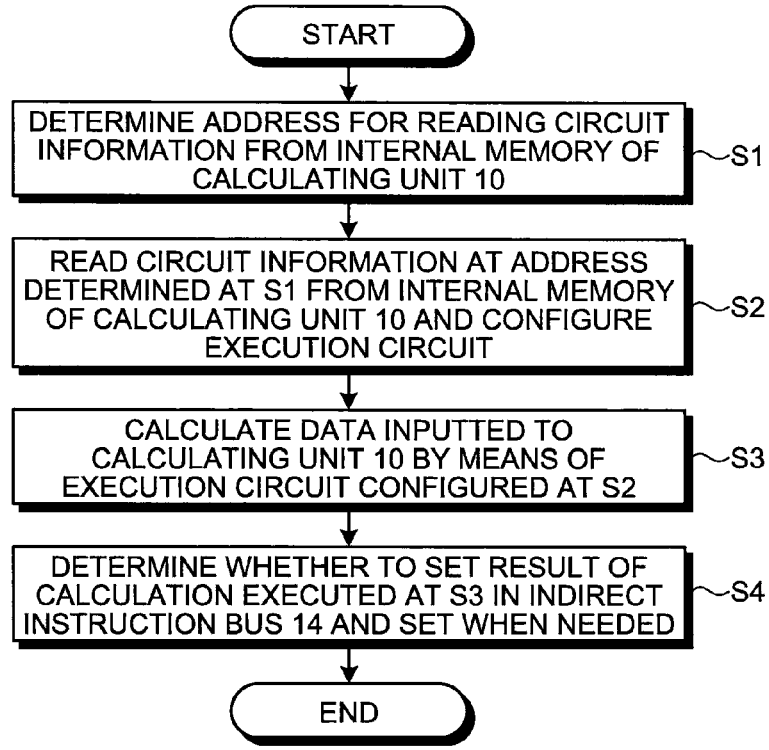
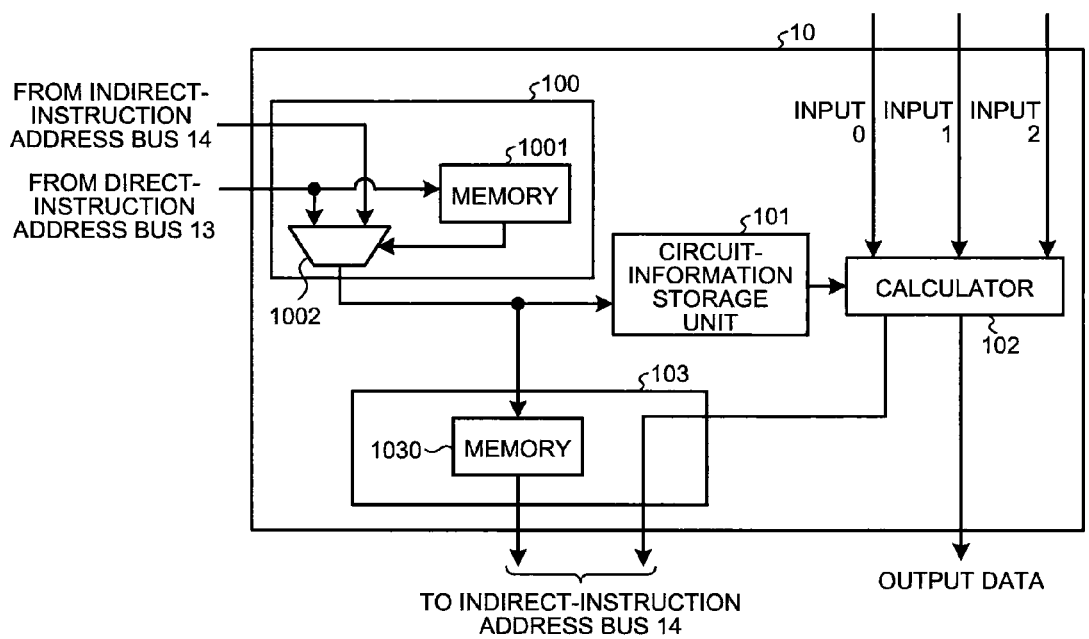

FIG.4

| ADDRESS | OUTPUT VALUE |
|---|---|
| 0 | 0 |
| 1 | 1 |
| 2 | 1 |
| 3 | 0 |
| 4 | 0 |
| 5 | 1 |
| 6 | 0 |
| 7 | 0 |
| 8 | 1 |
| 9 | 1 |
| 10 | 0 |

FIG.7

| ADDRESS | OUTPUT VALUE |
|---------|--------------|
| 0 | 1 |
| 1 | 0 |
| 2 | 1 |
| 3 | 1 |
| 4 | 0 |
| 5 | 0 |
| 6 | 1 |
| 7 | 0 |
| 8 | 0 |
| 9 | 1 |
| 10 | 1 |

FIG.9

ADDRESS FOR READING DATA
INPUTTED TO INPUT 0 OF
CALCULATING UNITS 10A TO
10C FROM DATA MEMORY 12

ADDRESS FOR READING DATA INPUTTED
TO INPUT 1 OF CALCULATING UNITS 10A
TO 10C FROM DATA MEMORY 12

| INPUT ADDRESS 0 | INPUT ADDRESS 1 | OUTPUT ADDRESS | INSTRUCTION ADDRESS | VALID FLAG | END FLAG |
|---|---|---|---|---|---|
| INPUT ADDRESS 0 | INPUT ADDRESS 1 | OUTPUT ADDRESS | INSTRUCTION ADDRESS | VALID FLAG | END FLAG |

⋮

| INPUT ADDRESS 0 | INPUT ADDRESS 1 | OUTPUT ADDRESS | INSTRUCTION ADDRESS | VALID FLAG | END FLAG |
|---|---|---|---|---|---|

FLAG INDICATING VALIDATION/INVALIDATION
OF WRITING OF CALCULATION RESULT INTO
DATA MEMORY 12

FLAG INDICATING END
OF PROGRAM CODE

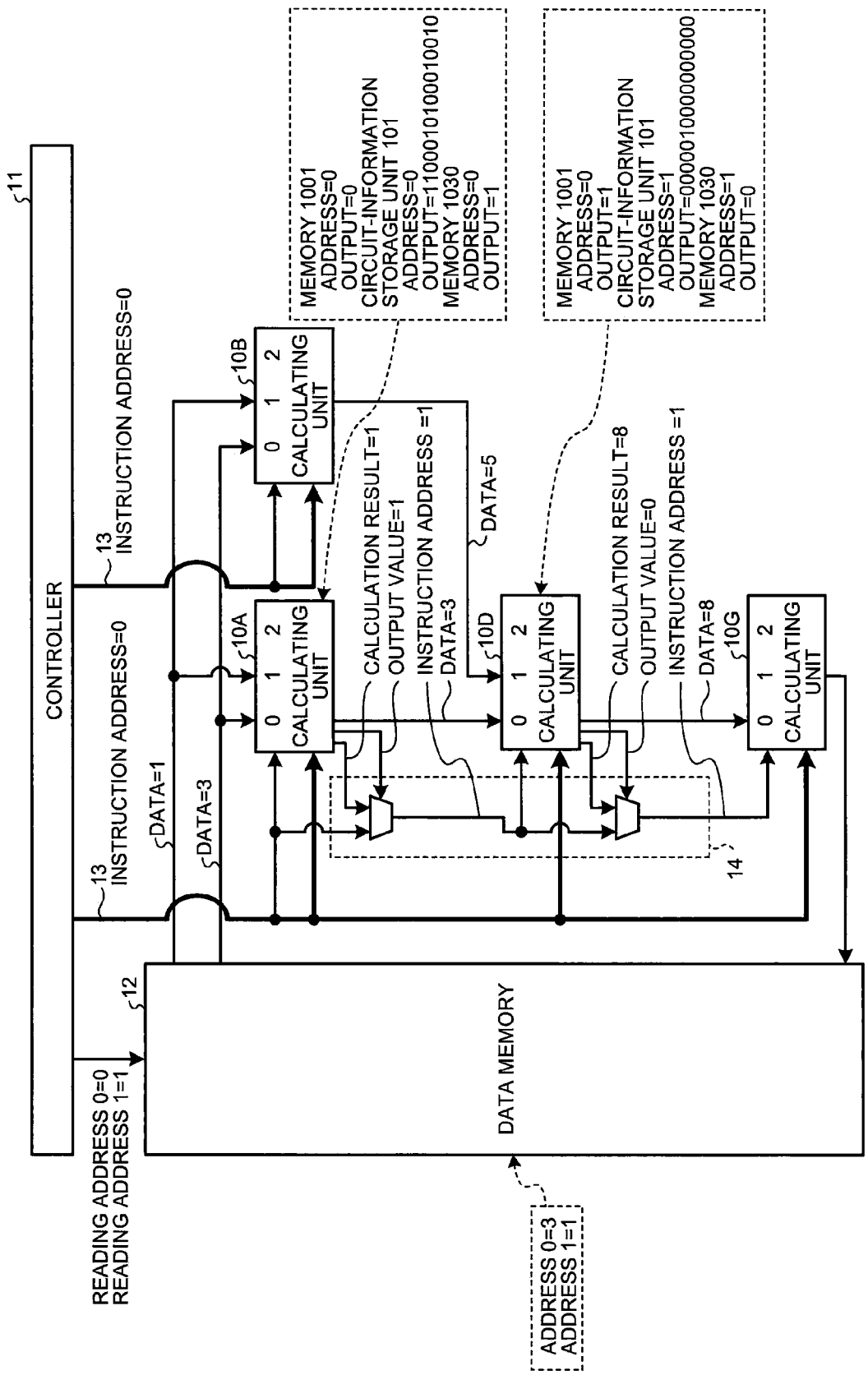

SELECTING CONFIGURATION MEMORY ADDRESS FOR EXECUTION CIRCUIT CONDITIONALLY BASED ON INPUT ADDRESS OR COMPUTATION RESULT OF PRECEDING EXECUTION CIRCUIT AS ADDRESS

CROSS-REFERENCE TO RELATED APPLICATIONS

This application is based upon and claims the benefit of priority from the prior Japanese Patent Application No. 2008-289397, filed on Nov. 12, 2008; the entire contents of which are incorporated herein by reference.

BACKGROUND OF THE INVENTION

1. Field of the Invention

The present invention relates to a semiconductor device and a data processing method.

2. Description of the Related Art

Recently, functions of devices that are demanded to have small areas and consume low amounts of power, such as mobile devices, are becoming more complicated and more diversified, and thus high performance is needed also for these devices. Manufacture and development of dedicated hardware is indispensable to successfully combine the high performance and downsizing and low power consumption. However, costs for manufacture and development of the dedicated hardware are increasing every year with the complexity and diversity of the functions. A semiconductor device that uses a dynamically reconfigurable circuit technology attracts attention as a device that can reduce the manufacture and development costs.

The semiconductor device that uses the dynamically reconfigurable circuit technology includes a reconfigurable circuit like a field programmable gate array (FPGA), and a storage device that stores therein plural pieces of circuit information required to configure a circuit to be executed in the reconfigurable circuit (hereinafter, simply "execution circuit"). This semiconductor device can configure an execution circuit by reading the circuit information required for an operation according to rules previously determined by software or the like. This semiconductor device is different from a typical semiconductor device that uses an FPGA in that the execution circuit can be changed during the operation.

When this semiconductor device is used, the development cost for dedicated hardware can be reduced like in the case of using an FPGA. Besides, various functions can be realized in the small semiconductor device by dynamically configuring the execution circuit. Therefore, reduction in the manufacture cost for dedicated hardware is also expected.

As examples of the semiconductor device that uses the dynamically reconfigurable circuit technology, there are a DRP (Dynamically Reconfigurable Processor, see "Reconfigurable System", Ohmsha Ltd., pp. 189 to 194) of NEC Electronics Corporation, and ADRES (Architecture for Dynamically Reconfigurable Embedded System, see "Custom implementation of the coarse-grained reconfigurable ADRES architecture for multimedia purposes", International Conference on Field Programmable Logic and Applications, pp. 106 to 111) of IMEC.

The DRP of NEC Electronics Corporation has a structure in which processing elements (PEs) as fundamental elements that execute calculations are arranged in a two-dimensional array, and a state transition controller is located at the center thereof. The PE is a calculating device capable of configuring an execution circuit, and plural pieces of circuit information including calculation types and connection relations between the PEs are stored in an instruction memory included in the PE. Each PE reads the circuit information from the instruction memory according to an instruction pointer provided by the state transition controller, and dynamically configures an execution circuit.

The state transition controller of the DRP enables simple state branching. The state transition controller determines a state of a branch destination based on an event signal transmitted from the PE array unit to the state transition controller. This system provides a mechanism of conditional execution in which, conditional upon results of calculations executed in the PE array, calculations to be executed next in the PE array are dynamically determined.

Meanwhile, the ADRES of IMEC has a structure in which reconfigurable cells (RCs) as fundamental elements that execute calculations are arranged in a two-dimensional array, and some of the RCs are coupled to a processor through a data register. The RC is a calculating device capable of configuring an execution circuit, and plural pieces of circuit information including calculation types and connection relations between the RCs are stored in a configuration memory included in the RC. The circuit information is read from the configuration memory by using an output of a configuration counter included in the RC as an address, and an execution circuit is dynamically configured.

The processor of the ADRES controls configuration of an execution circuit in the RC by initializing the configuration counter in the RC. The processor of the ADRES can read a result of a calculation executed by the RC through the data register. Accordingly, a mechanism of conditional execution can be realized in which, the configuration counter of the RC is initialized according to the read calculation result, thereby dynamically determining a calculation to be executed next in the RC conditional upon the calculation result from the RC.

The calculation executed in the RC supports predicate logics. Therefore, when different calculations are executed in different RCs and then only one calculation result is selected according to a predicate value calculated by another RC to set the selected result in the register of the RC, conditional executions in units of data can be also achieved.

To realize a high-performance semiconductor device that uses the dynamically reconfigurable circuit technology, the conditional execution in which, according to a result of a calculation executed by the semiconductor device, a calculation to be executed next is determined needs to be performed speedily.

However, because the DRP performs the conditional execution using the mechanism of state branching in the state transition controller, the conditional execution under a condition of different calculation results cannot be simultaneously performed in the PEs. Only the conditional execution under a condition of one calculation result can be performed in all the PEs.

In the mechanism of conditional execution using the predicate logics in the ADRES, many RCs are needed to perform one conditional execution while the conditional executions in units of data can be performed.

In the mechanism of conditional execution using the processor in the ADRES, a more complicated conditional execution than the conditional execution that uses a simple state branching mechanism in the DRP can be performed. However, because processing for determining, conditional upon a calculation result in the RC, a calculation to be executed next is determined is realized by the processor, time required for the conditional execution is longer than that required by the DRP.

SUMMARY OF THE INVENTION

According to one aspect of the present invention, a semiconductor device includes a first circuit that is dynamically reconfigurable, and executes a first calculation; a second circuit that is dynamically reconfigurable, includes a first storage unit therein, and executes a second calculation; a controller that outputs a first address specifying a first execution circuit for the first calculation and a second execution circuit for the second calculation, to the first circuit and the second circuit, and controls input of data into the first circuit; and a bus that transfers a result of the first calculation executed by the first circuit to the second circuit, wherein the first circuit executes the first calculation with respect to first input data into the first circuit, by means of the first execution circuit specified by the first address, and outputs the result of the first calculation to the bus, and the second circuit specifies the second execution circuit based on one of the first address and the result of the first calculation, executes the second calculation with respect to second input data into the second circuit by means of the second execution circuit, and outputs a result of the second calculation, wherein the one of the first address and the result of the first calculation is determined based on first information specified by the first address.

According to another aspect of the present invention, a data processing method performed by a semiconductor device that includes a first circuit being dynamically reconfigurable, a second circuit being dynamically reconfigurable and including a storage unit therein, a controller, and a bus, the method includes first outputting by the controller of outputting a first address indicating an area of the storage unit to the first circuit and the second circuit; controlling by the controller of controlling input of data into the first circuit; first calculating by the first circuit of executing the first calculation with respect to first input data into the first circuit, by means of a first execution circuit for the first calculation and specified by the first address; transferring by the first circuit of transferring a result of the first calculation executed in the first calculating to the second circuit via the bus; specifying a second execution circuit for the second calculation, based on one of the first address and the result of the first calculation, the one of the first address and the result of the first calculation being determined based on information specified by the first address; second calculating by the second circuit of executing the second calculation with respect to second input data into the second circuit, by means of the second execution circuit; and second outputting by the second circuit of outputting a result of the second calculation executed in the second calculating.

BRIEF DESCRIPTION OF THE DRAWINGS

FIG. 2 is a flowchart of an operation of a calculating unit;
FIG. 3 is a block diagram of the calculating unit;
FIG. 4 is a diagram of an example of addresses as values of a direct-instruction address bus and output values corresponding to the addresses, stored in a memory;
FIG. 7 is a diagram of an example of addresses as values outputted from an instruction-address determining unit and output values corresponding to the addresses, stored in a memory;
FIG. 9 is a diagram of an example of a structure of a program code stored in a program code memory;
FIG. 10 is a schematic diagram for explaining an operation when the semiconductor device performs a calculation.

DETAILED DESCRIPTION OF THE INVENTION

Exemplary embodiments of a semiconductor device and a data processing method according to the present invention will be explained below in detail with reference to the accompanying drawings. The present invention is not limited to the embodiments.

Figure 1:
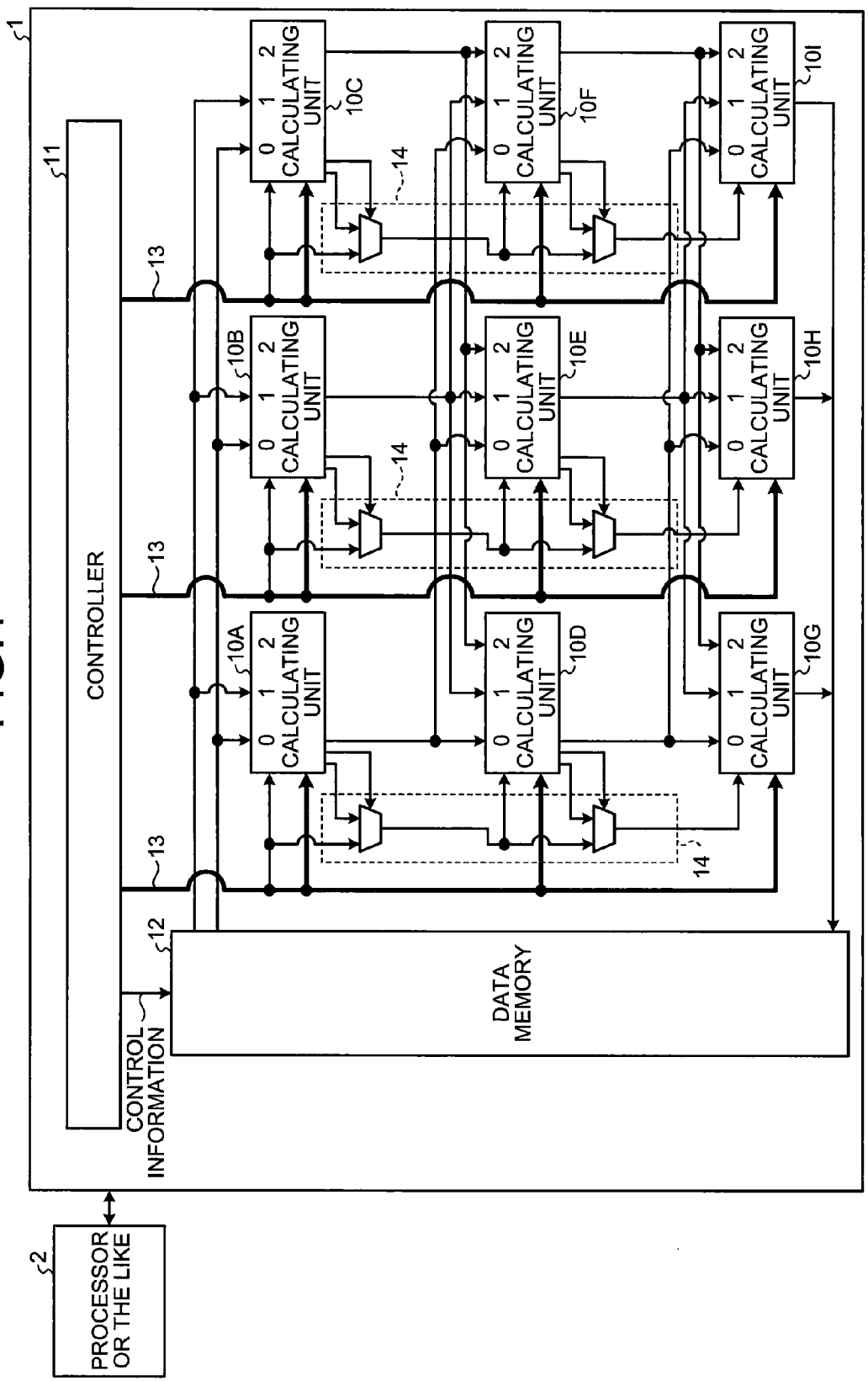
FIG. 1 is a block diagram of a semiconductor device according to an embodiment of the present invention.

As shown in FIG. 1, a semiconductor device 1 performs data processing according to an instruction from an external device 2 such as a processor. The semiconductor device 1 includes nine calculating units 10A to 10I, a controller 11, a data memory 12, a direct-instruction address bus 13, and an indirect-instruction address bus 14. In this example, the data processing is a generic term used to refer to a sequence of calculations including individual calculations.

The calculating units 10A to 10I each configure an execution circuit according to circuit information for specifying an execution circuit required for a calculation, and achieve data processing. As the circuit information, various types of information can be used depending on examples. For example, a table indicating correspondence relations between input data and output data with respect to the calculating units 10A to 10I, or values of a set signal for determining types of calculations executed by the calculating units 10A to 10I can be used. The circuit information is stored by the external device 2 in memories included in the calculating units 10A to 10I.

The calculating units 10A to 10I are connected to the direct-instruction address bus 13 and the indirect-instruction address bus 14. The calculating units 10A to 10I each read the circuit information from a memory (a circuit-information storage unit 101 explained later) included in each of the calculating units 10A to 10I using one of a value of the direct-instruction address bus 13 and a value of the indirect-instruction address bus 14 as an address, and configure an execution circuit.

The calculating units 10A to 10C are connected to the data memory 12 and the calculating units 10D to 10F. The calculating units 10A to 10C perform calculations with respect to data inputted from the data memory 12 by means of execution circuits configured, and output results of the calculations to the calculating units 10D to 10F and the indirect-instruction address bus 14. The calculating units 10D to 10F are connected to the calculating units 10A to 10C and 10G to 10I. The calculating units 10D to 10F perform calculations with respect to data inputted from the calculating units 10A to 10C, and output results of the calculations to the calculating units 10G to 10I and the indirect-instruction address bus 14. The calculating units 10G to 10I are connected to the calculating units 10D to 10F and the data memory 12. The calculating units 10G to 10I perform calculations with respect to data inputted from the calculating units 10D to 10F, and output results of the calculations to the data memory 12.

Up to three data are inputted to the calculating units 10A to 10I, respectively. Data ports for inputting the data to the calculating units 10A to 10I are referred to as inputs 0, 1, and 2 of the respective calculating unit 10. In FIG. 1, reference numerals 0, 1, and 2 in corresponding blocks of the calculating units 10A to 10I denote the data ports of the inputs 0, 1, and 2, respectively. In the present embodiment, only two data (inputs 0 and 1) are inputted to the calculating units 10A to 10C.

The calculating units 10A to 10I configure a dynamically reconfigurable circuit. The dynamically reconfigurable circuit can be of any type so long as it has a circuit in which a relation between input and output signals is changed according to information (circuit information) that can take plural different values. For example, the dynamically reconfigurable circuit can include a circuit in which the input-output relation is changed according to circuit information specified by an instruction address (for example, pointer) among plural pieces of circuit information stored in a memory. Alternatively, the dynamically reconfigurable circuit can include plural calculating units, in which details of calculations executed by the calculating units (input-output relations) and connection relations between the calculating units are changed according to circuit information.

Although nine calculating units 10 are provided in the present embodiment, the number of the calculating units 10 can be changed according to a calculation capability required for the semiconductor device 1, or the like. The number of data lines connecting between the calculating units 10, or the number of data lines connecting between the calculating units 10 and the data memory 12 can be also changed according to a required data transfer capability. The calculating units 10A to 10I can read the circuit information from an external memory, instead of the internal memory. A configuration of the calculating unit 10 will be explained in more detail later, in connection with an explanation of data processing performed by the calculating unit 10.

The controller 11 connects to the data memory 12 and the direct-instruction address bus 13. The controller 11 sets an address in the direct-instruction address bus 13 in each cycle according to a code stored in a storage unit (a program code memory 11B explained later) to enable the calculating units 10A to 10I to read the circuit information from the respective internal memory. The controller 11 outputs control information to the data memory 12 according to the same code to control data reading from the data memory 12 or data writing into the data memory 12. The cycle in this example is a minimum time unit from when a value of a memory element changes in a synchronous circuit until when the value of the memory element changes next. A configuration of the controller 11 will be explained in more detail later, in connection with an explanation of data processing performed by the controller 11.

The data memory 12 temporarily stores therein data provided by the semiconductor device 1 at a start of data processing, and an intermediate result or a final result of the data processing performed by the semiconductor device 1. Initial input data is written in the data memory 12 by the external device 2 before the start of the data processing. The semiconductor device 1 also can continue the data processing using again the intermediate result of the data processing, stored in the data memory 12, as input data. The final result stored in the data memory 12 is read from the data memory 12 by the external device 2.

The direct-instruction address bus 13 outputs an instruction address received from the controller 11 to the calculating units 10A to 10I. The indirect-instruction address bus 14 transfers a calculation result received from the calculating unit 10 of the previous stage to the calculating unit 10 of the subsequent stage.

An outline of a flow from a start to an end of data processing performed by the semiconductor device 1 according to the present embodiment is explained.

The controller 11 interprets a code stored in the storage unit (the program code memory 11B explained later) in each cycle. According to the interpreted code, the controller 11 sets an address in the direct-instruction address bus 13 to enable the calculating units 10A to 10I to read the circuit information required for the data processing from the respective internal memory (the circuit-information storage unit 101 explained later). The controller 11 interprets the same code to transfer control information (a data reading request and a data writing request) to the data memory 12.

Upon each receipt of the data reading request from the controller 11, the data memory 12 reads data from the data memory 12 according to the request, and transfers the read data to the calculating units 10A to 10C. Upon each receipt of the data writing request from the controller 11, the data memory 12 writes data outputted from the calculating units 10G to 10I according to the request into the data memory 12.

The calculating unit 10 performs a calculation in each cycle. FIG. 2 is a flowchart of an operation of the calculating unit 10. The calculating unit 10 first determines which one of a value of the direct-instruction address bus 13 and a value of the indirect-instruction address bus 14 is to be used as an address for reading the circuit information from the internal memory (the circuit-information storage unit 101 explained later) of the calculating unit 10 (Step S1). A method of determining the value is explained later in connection with an explanation of data processing performed by the calculating unit 10.

The calculating unit 10 then reads the circuit information from the internal memory (the circuit-information storage unit 101 explained later) using the value determined at Step S1 as an address, and configures an execution circuit required for the data processing (Step S2).

The calculating unit 10 then calculates data inputted from the data memory 12 or another calculating unit 10 by means of the execution circuit configured at Step S2, and outputs a result of the calculation to the data memory 12 or another calculating unit 10 connected (Step S3).

The calculating unit 10 finally determines whether to set the result of the calculation executed at Step S3 in the indirect-instruction address bus 14, and, when it is determined that the result needs to be set, sets the result of the calculation executed at Step S3 in the indirect-instruction address bus 14 (Step S4). When it is determined that the result does not need to be set, the result of the calculation executed at Step S3 is not set in the indirect-instruction address bus 14, and a result previously set by another calculating unit 10 remains set in the indirect-instruction address bus 14.

The value set in the indirect-instruction address bus 14 by the calculating unit 10 at Step S4 is used by another calculating unit 10 to which the calculation result is outputted by the calculating unit 10 as an address for reading the circuit information at Step S1. In this way, calculations to be executed by all of the calculating units 10A to 10I in each cycle are determined, and the determined calculations are executed.

When having interpreted all codes, the controller 11 notifies the external device 2 of completion of the processing, and then the data processing is terminated.

Upon receipt of the notification of the processing completion, the external device 2 finally reads the results of the calculations executed by the semiconductor device 1, stored in the data memory 12.

The data processing performed by the calculating unit 10 is explained in detail below. As shown in FIG. 3, the calculating unit 10 includes an instruction-address determining unit 100, the circuit-information storage unit 101, a calculator 102, and an indirect-instruction-address output unit 103.

The instruction-address determining unit 100 determines which one of the value of the direct-instruction address bus 13 and the value of the indirect-instruction address bus 14 is to be used as an address for reading the circuit information from the circuit-information storage unit 101. The instruction-address determining unit 100 connects to the direct-instruction address bus 13, the indirect-instruction address bus 14, the circuit-information storage unit 101, and the indirect-instruction-address output unit 103.

The instruction-address determining unit 100 includes a memory 1001 and a selector 1002. The memory 1001 stores therein addresses as values of the direct-instruction address bus 13 and output values corresponding to the addresses, associated with each other. The output value is used for information that determines an address in the circuit-information storage unit 101. In the present embodiment, 0 (zero) or 1 is stored as an output value corresponding to an address 0, 1, 2, . . . , or n, which is the value of the direct-instruction address bus 13. When an address as the value of the direct-instruction address bus 13 is inputted to the memory 1001, the memory 1001 outputs the corresponding output value to the selector 1002.

As shown in FIG. 4, a relation between the address as the value of the direct-instruction address bus 13 and the corresponding output value, stored in the memory 1001, can be arbitrarily set with respect to each of the calculating units 10A to 10I. In the present embodiment, information as shown in FIG. 4 is stored in the memory 1001; however, the information is not limited thereto. The information can be of any type that enables to uniquely select one of the value of the direct-instruction address bus 13 and the value of the indirect-instruction address bus 14.

The value of the direct-instruction address bus 13, the value of the indirect-instruction address bus 14, and the output value from the memory 1001 are inputted to the selector 1002. The selector 1002 selects one of the values of the direct-instruction address bus 13 and the indirect-instruction address bus 14 based on the output value from the memory 1001, and outputs the selected value to the circuit-information storage unit 101 and the indirect-instruction-address output unit 103. The outputted value (address) is used as an address for reading the circuit information from the circuit-information storage unit 101. In the present embodiment, the value of the direct-instruction address bus 13 is selected when the value read from the memory 1001 is 0, and the value of the indirect-instruction address bus 14 is selected when the value is 1.

The circuit-information storage unit 101 is a memory that stores therein the circuit information for determining an execution circuit to be configured in the calculator 102. The circuit-information storage unit 101 connects to the instruction-address determining unit 100 and the calculator 102. The circuit information corresponding to the value (address) outputted from the instruction-address determining unit 100 is read from the circuit-information storage unit 101, and outputted to the calculator 102.

Figure 5:
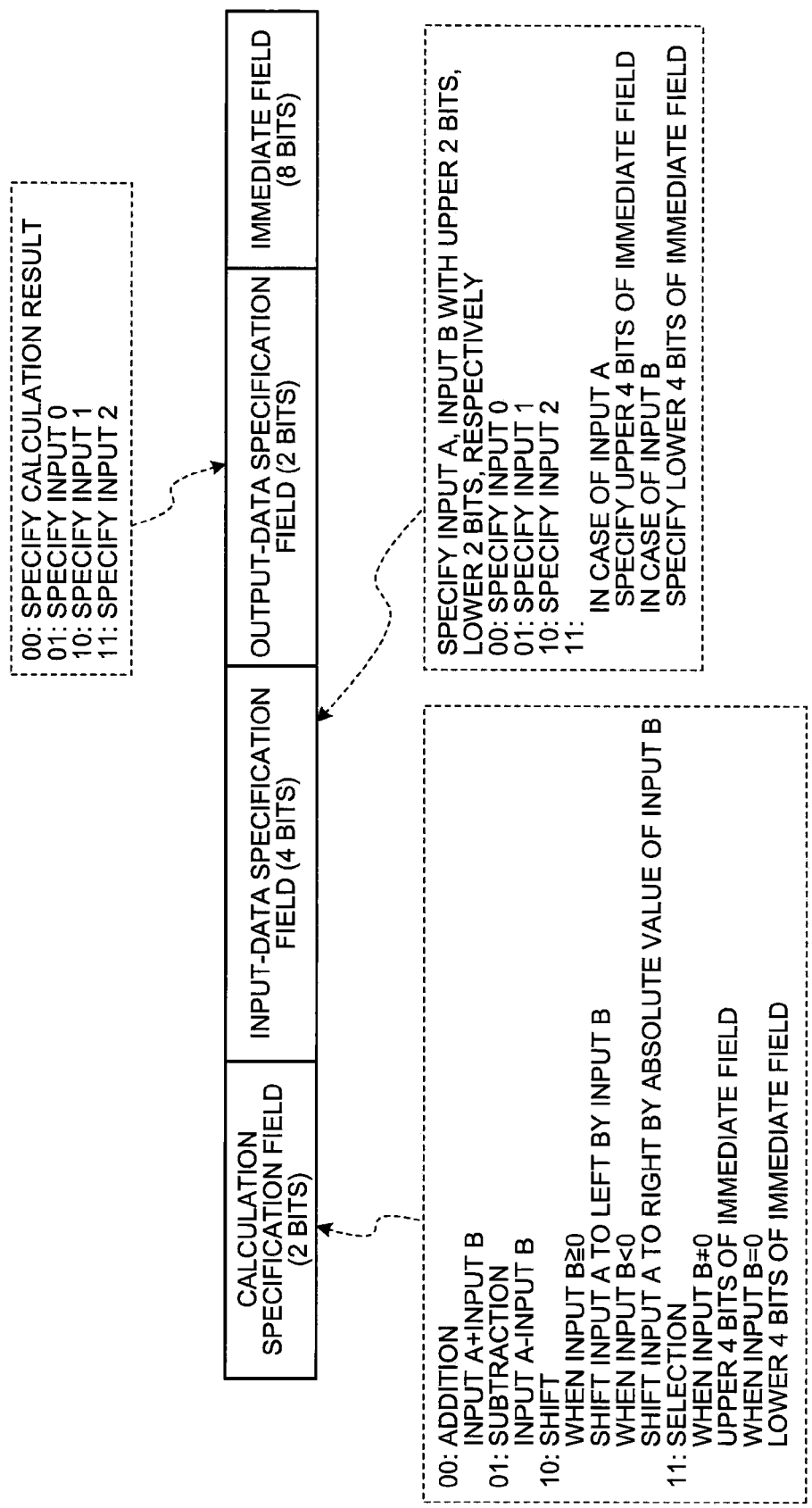
FIG. 5 is a diagram of a structure of circuit information stored in a circuit-information storage unit.

As shown in FIG. 5, the circuit information includes a calculation specification field, an input-data specification field, an output-data specification field, and an immediate field.

The calculation specification field is circuit information for specifying a type of a calculation to be executed by the calculator 102. In the present embodiment, the calculation specification field is two bits, and determines a type of a calculation to be executed by the calculator 102 according to rules as shown in FIG. 5. Definition of the calculation specification field can be changed according to the types (number) of calculations required for the calculator 102.

The input-data specification field specifies which one of data inputted to the calculating unit 10 is to be used as an input A or B for the calculator 102. In the present embodiment, the data inputted from the data ports of the inputs 0, 1, and 2, and data stored in the immediate field are inputted to the calculating unit 10. In the present embodiment, the input-data specification field is four bits, and determines the input A or B for the calculator 102 according to rules as shown in FIG. 5. Definition of the input-data specification field can be changed according to the number of connections between the calculating units 10 or the number of input data required for the calculator 102.

The output-data specification field specifies data to be outputted by the calculating unit 10. In the present embodiment, the output-data specification field is two bits. A result of a calculation executed by the calculator 102 is outputted from the calculating unit 10 when the output-data specification field is "00", and the data inputted through the data ports of the inputs 0, 1, and 2 of the respective calculating unit 10 are outputted as they are from the calculating unit 10 when the output-data specification field is "01", "10", and "11", respectively. Definition of the output-data specification field can be changed according to the number of data inputted to the calculating unit 10.

The function of outputting the value of the data inputted through the data port of the input 0, 1, or 2 of the calculating unit 10 as it is from the calculating unit 10 is effective for the following reason. In the semiconductor device 1 that enables to set the result of the calculation executed by the calculating unit 10 in the indirect-instruction address bus 14 and then causes another calculating unit 10 to use the calculation result as an address for reading the circuit information stored in the circuit-information storage unit 101 to be used for a calculation, sufficient data paths to transfer data required for the data processing can be ensured. When this function is not provided, the data used for the data processing cannot be transferred from the calculating unit 10 to another calculating unit 10 when the calculating unit 10 sets the calculation result in the indirect-instruction address bus 14. Accordingly, the number of available data paths is reduced.

The immediate field stores therein data to be inputted to the calculator 102 when an immediate value is specified by the input-data specification field as an input to the calculator 102. The immediate field is also used as a field that specifies data outputted as a result of a selective calculation. The data stored in the immediate field can be commonly used as the data to be inputted to the calculator 102 and the data outputted as a result of a selective calculation. In the present embodiment, the immediate field is eight bits, and the data to be inputted when an immediate value is specified as the input A or B of the calculator 102 is stored in every four bits. Definition of the immediate field can be properly changed according to required accuracy of an immediate value, the number of inputs to the calculator 102, or the like.

The calculator 102 configures an execution circuit required for a calculation according to the circuit information inputted from the circuit-information storage unit 101, and performs the calculation. The calculator 102 connects to the circuit-information storage unit 101, the indirect-instruction-address output unit 103, the data ports of the inputs 0, 1, and 2, and the calculating unit 10 of the subsequent stage (the data memory 12 in the case of the calculating unit 10 of the last stage).

Figure 6:
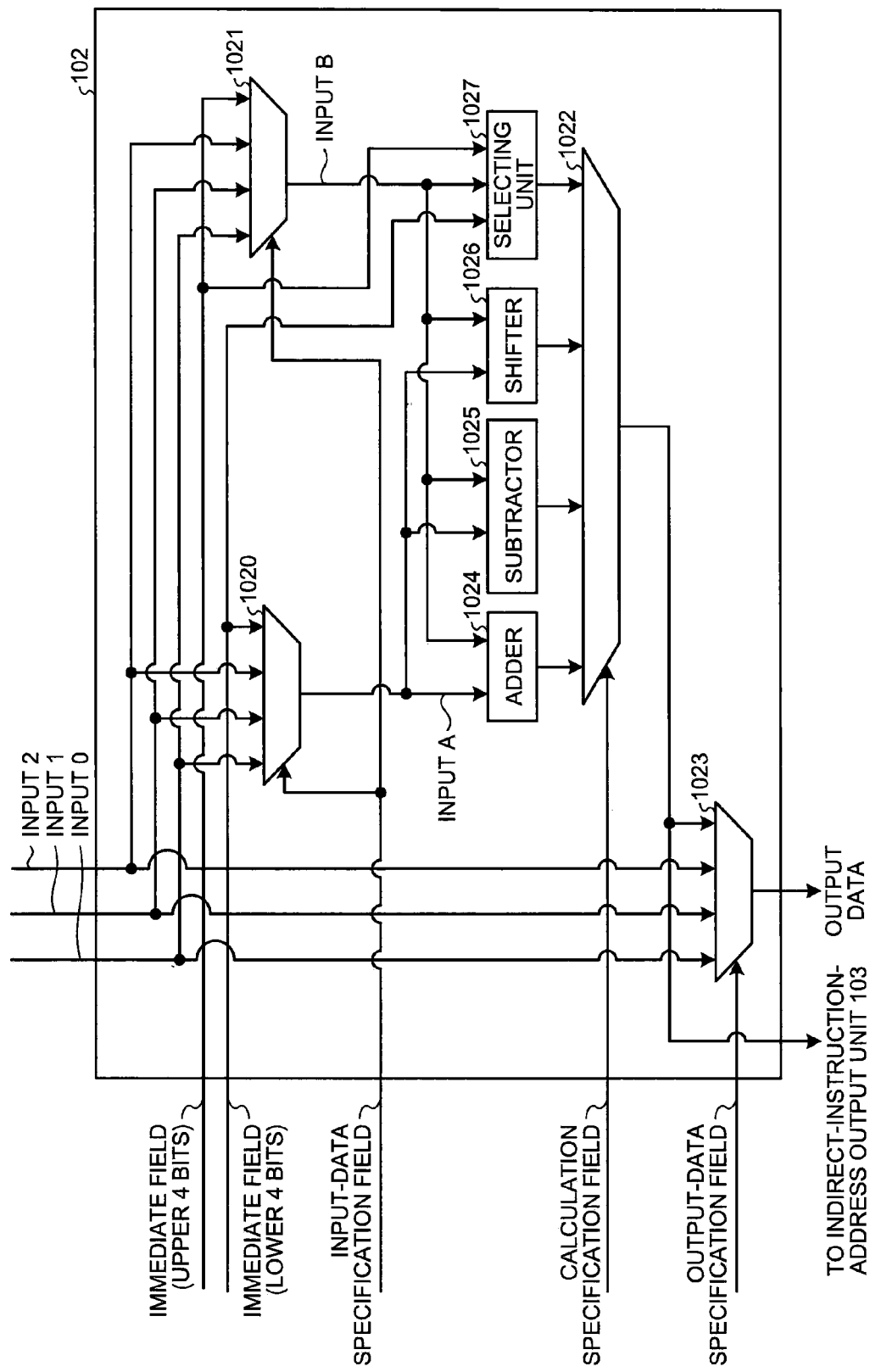
FIG. 6 is a block diagram of an example of a calculator.

As shown in FIG. 6, configuration of an execution circuit for selecting one of the input A, the input B, and the output from the calculating unit 10 according to the circuit information is realized by selecting one of outputs from selectors 1020, 1021, and 1023 according to the input-data specification field and the output-data specification field in the circuit information. Configuration of an execution circuit for performing a calculation specified by the calculation specification field in the circuit information is realized by separately performing calculations that can be specified by the calculation specification field by means of an adder 1024, a subtractor 1025, a shifter 1026, and a selecting unit 1027, respectively, and selecting one of results of the calculations by means of a selector 1022 according to the calculation specification field.

The data selected by the selector 1022 is outputted directly to the indirect-instruction-address output unit 103 regardless of the value of the output-data specification field in the circuit information. Meanwhile, one of the data inputted through the data ports of the inputs 0, 1, and 2, and the output from the selector 1022 is selected by the selector 1023 according to the value of the output-data specification field, and outputted as the output data from the calculating unit 10.

The indirect-instruction-address output unit 103 determines whether to set the data inputted from the calculator 102 in the indirect-instruction address bus 14. The indirect-instruction-address output unit 103 connects to the instruction-address determining unit 100, the calculator 102, and the indirect-instruction address bus 14.

The indirect-instruction-address output unit 103 includes a memory 1030. The memory 1030 stores therein addresses, which are the values outputted from the instruction-address determining unit 100 (either the values of the direct-instruction address bus 13 or the values of the indirect-instruction address bus 14), and output values corresponding to the addresses, associated with each other. The output value is used as information for determining whether to set the data value inputted from the calculator 102 in the indirect-instruction address bus 14. In the present embodiment, 0 or 1 is stored as an output value corresponding to an address 0, 1, 2, . . . , or n, which is the value outputted from the instruction-address determining unit 100. When an address as the value outputted from the instruction-address determining unit 100 is inputted to the memory 1030, the memory 1030 outputs an output value corresponding to the address, to the indirect-instruction address bus 14.

In FIG. 7, a relation between the addresses as the values outputted from the instruction-address determining unit 100 and the output values corresponding to the addresses, stored in the memory 1030, can be arbitrary set with respect to each of the calculating units 10A to 10I. In the present embodiment, information as shown in FIG. 7 is stored in the memory 1030; however, the information is not limited thereto, and can be any information so long as it enables to uniquely determine whether to set the data value inputted from the calculator 102 in the indirect-instruction address bus 14.

The indirect-instruction-address output unit 103 outputs the output value from the memory 1030 to the indirect-instruction address bus 14, and outputs the data inputted from the calculator 102 directly to the indirect-instruction address bus 14. In the present embodiment, the value inputted from the calculator 102 is not set in the indirect-instruction address bus 14 when the output value from the memory 1030 is 0, and the value inputted from the calculator 102 is set in the indirect-instruction address bus 14 when the output value from the memory 1030 is 1. When the value inputted from the calculator 102 is not set in the indirect-instruction address bus 14, a value previously set remains set without change.

Figure 8:
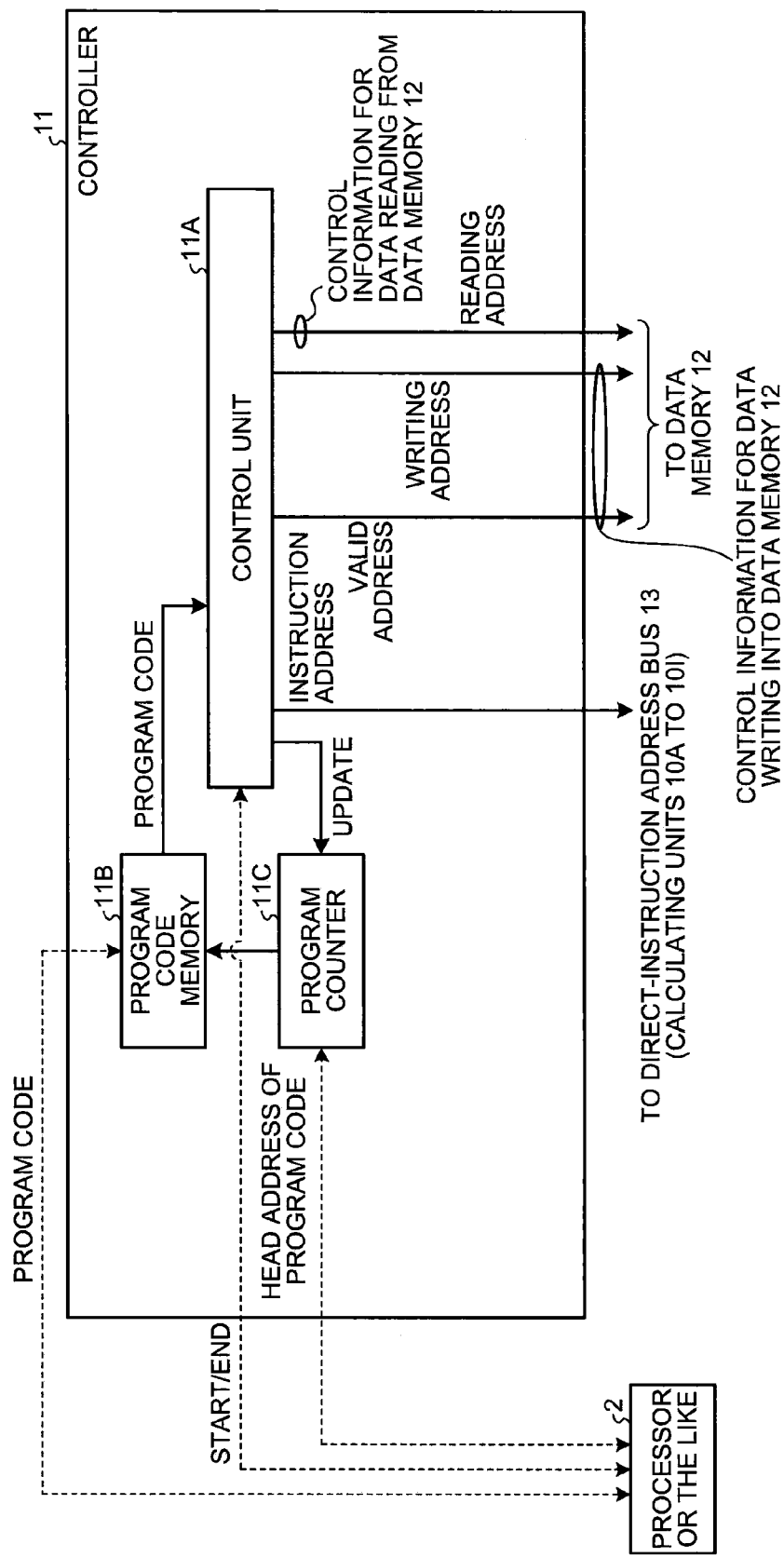
FIG. 8 is a block diagram of a controller.

The data processing performed by the controller 11 is explained in detail below. As shown in FIG. 8, the controller 11 includes a control unit 11A, a program code memory 11B, and a program counter 11C.

The control unit 11A connects to the program code memory 11B and the program counter 11C. The control unit 11A reads a program code from the program code memory 11B using a value of the program counter 11C as an address. The control unit 11A outputs control information (a reading address) for data reading from the data memory 12 and control information (a writing address and a valid flag explained later) for data writing into the data memory 12, to the data memory 12 according to the read program code, and outputs an instruction address to the direct-instruction address bus 13.

The program code is written in the program code memory 11B by the external device 2 before start of the data processing. The value of the program counter 11C is updated with a head address of the program code.

As shown in FIG. 9, in the present embodiment, the program code includes input addresses (reading addresses) indicating reading addresses of the data memory 12, an output address (writing address) indicating a writing address of the data memory 12, an instruction address, a valid flag, and an end flag. Because data are inputted through the two data ports of the inputs 0 and 1 in the present embodiment, there two input addresses, i.e., input addresses 0 and 1.

One address in the program code is interpreted in one cycle. The program counter 11C is incremented by one after interpretation of one address. The input addresses (reading addresses), the output address (writing address), and the valid flag are transferred to the data memory 12. The valid flag indicates whether writing into the data memory 12 is valid. When the writing into the data memory 12 is not valid, results of the calculations by the calculating units 10G to 10I are not written into the data memory 12.

The end flag indicates an end of the program code. Upon finish of interpretation of the end address of the program code, the control unit 11A notifies the external device 2 of completion of the data processing. The control unit 11A outputs the valid flag to invalidate writing into the data memory 12 until start of new data processing is notified by the external device 2.

An example of an operation of the semiconductor device 1 according to the present embodiment when performing calculations under conditions is explained below. FIG. 10 depicts only constituent units of the semiconductor device 1 explained in this operation example, and other constituent units are omitted. To simplify the explanation, operations of only the calculating units 10 necessary to explain the operation example are explained, and explanations of operations of other calculating units 10 will be omitted.

The controller 11 first sets "0" in the direct-instruction address bus 13 and transfers, to the data memory 12, a reading request for data to be transferred to the data ports of the inputs 0 and 1 of the calculating units 10A and 10B. In this operation example, an address of the input address (reading address) 0 is 0, and an address of the input address (reading address) 1 is 1. Data "3" stored at an address 0 of the data memory 12 is transferred to the data ports of the input 0 of the calculating units 10A and 10B, and data "1" stored at an address 1 of the data memory 12 is transferred to the data ports of the input 1 of the calculating units 10A and 10B. The value "0" set in the direct-instruction address bus 13 is transferred to the instruction-address determining units 100 of the calculating units 10A and 10B, respectively.

The calculating unit 10A performs the following operation. The instruction-address determining unit 100 first reads an output value "0" in the memory 1001, corresponding to the address "0" of the direct-instruction address bus 13, and outputs the output value "0" to the selector 1002. Because the output value read from the memory 1001 is "0", the selector 1002 selects the value "0" of the direct-instruction address bus 13, and outputs the value "0" of the direct-instruction address bus 13 to the circuit-information storage unit 101.

The circuit information corresponding to the address "0" outputted from the instruction-address determining unit 100 is read from the circuit-information storage unit 101, and outputted to the calculator 102. In the circuit information at this time, the calculation specification field is "11", the input-data specification field is "0001", the output-data specification field is "01", and the immediate field is "00010010". The calculator 102 performs a calculation corresponding to the circuit information. Because the input-data specification field of the circuit information is "0001", the input A becomes the data "3" from the data port of the input 0, and the input B becomes the data "1" from the data port of the input 1. Because the calculation specification field of the circuit information is "11", selection is set as the calculation. Because the input B is not 0, upper four bits "0001" of the immediate field "00010010", that is, "1" is selected. Accordingly, a result of the calculation by the calculator 102 becomes "1".

In the indirect-instruction-address output unit 103, because the value outputted from the instruction-address determining unit 100 is "0", an output value "1" is read from an address "0" in the memory 1030. When the output value is "1", "1" which is the calculation result of the calculator 102 is set in the indirect-instruction address bus 14. Because the output-data specification field of the circuit information is "01", the data "3" inputted from the data memory 12 to the data port of the input 0 of the calculating unit 10A is outputted from the calculating unit 10A as output data.

The output data "3" from the calculating unit 10A is transferred to the data port of the input 0 of the calculating unit 10D, and output data "5" from the calculating unit 10B is transferred to the data port of the input 1 of the calculating unit 10D. The value "0" set in the direct-instruction address bus 13 is transferred to the instruction-address determining unit 100 of the calculating unit 10D.

The calculating unit 10D then performs the following operation. In the instruction-address determining unit 100, an output value "1" in the memory 1001, corresponding to the address "0" of the direct-instruction address bus 13 is read and outputted to the selector 1002. Because the output value read from the memory 1001 is "1", the selector 1002 selects the value "1" of the indirect-instruction address bus 14, and outputs the value "1" of the indirect-instruction address bus 14 to the circuit-information storage unit 101.

The circuit information corresponding to an address "1", which is outputted from the instruction-address determining unit 100, is then read from the circuit-information storage unit 101, and outputted to the calculator 102. The circuit information at this time has the calculation specification field of "00", the input-data specification field of "0001", the output-data specification field of "00", and the immediate field of "00000000". The calculator 102 performs a calculation according to the circuit information. Because the input-data specification field of the circuit information is "0001", the input A becomes the data "3" from the data port of the input 0, and the input B becomes the data "5" from the data port of the input 1. Because the calculation specification field in the circuit information is "00", addition is set as the calculation, and accordingly a result of the calculation executed by the calculator 102 becomes 3+5="8".

In the indirect-instruction-address output unit 103, the value outputted from the instruction-address determining unit 100 is "1", and therefore an output value "0" is outputted from an address "1" in the memory 1030. When the output value is "0", "8" which is the calculation result of the calculator 102 is not set in the indirect-instruction address bus 14, and "1" which is the result of the calculation previously executed by the calculating unit 10A remains set. Because the output-data specification field in the circuit information is "00", "8" as the calculation result of the calculator 102 is outputted from the calculating unit 10D as output data.

In the operation example described above, the data inputted from the data memory 12 to the data port of the input 1 of the calculating unit 10A is "1". Accordingly, "1" is set in the indirect-instruction address bus 14, and the calculating unit 10D performs a calculation according to the circuit information read from the address "1" of the circuit-information storage unit 101. Meanwhile, the following operation is performed when data inputted from the data memory 12 to the data port of the input 1 of the calculating unit 10A is "0".

That is, the input B becomes data "0" from the data port of the input 1. Because the calculation specification field in the circuit information is "11", selection is set as the calculation. Because the input B is "0", "0010" which are lower four bits of the immediate field "00010010", that is, "2" is selected, and thus a result of the calculation executed by the calculator 102 becomes "2". In the indirect-instruction-address output unit 103, because a value outputted from the instruction-address determining unit 100 is "0", an output value "1" is read from an address "0" of the memory 1030. The result "2" of the calculation executed by the calculator 102 is set in the indirect-instruction address bus 14, and then the calculating unit 10D performs a calculation according to the circuit information read from an address "2" in the circuit-information storage unit 101.

In this way, a calculation to be executed by a calculating unit 10 can be executed conditionally under a condition of data inputted from the data memory 12 or another calculating unit 10.

In the operation example described above, the operation of the calculating unit 10D when a calculation is executed conditionally according to data inputted from the data memory 12 to the calculating unit 10A has been explained. In addition, various types of conditional execution are enabled by setting appropriate values in the memory 1001 of the instruction-address determining unit 100 and the memory 1030 of the indirect-instruction-address output unit 103.

For example, when an output value "1" is set at an address "0" in the memory 1001 of the calculating unit 10G in the operation example described above, the value "1" as the calculation result of the calculating unit 10A, which is set in the indirect-instruction address bus 14, is outputted to the circuit-information storage unit 101. As a result, a calculation to be executed by the calculating unit 10G can be also executed conditionally according to the data inputted from the data memory 12 to the calculating unit 10A.

When, in the operation example described above, an output value "1" is set at an address "1" in the memory 1030 of the calculating unit 10D, and an output value "1" is set at an address "0" in the memory 1001 of the calculating unit 10G, a calculation result of the calculating unit 10D is set in the indirect-instruction address bus 14. Accordingly, in the calculating unit 10G, the circuit information is read from the circuit-information storage unit 101 using the calculation result of the calculating unit 10D as an address, to perform a calculation. In this operation example, the calculating unit 10D first executes the calculation conditionally according to the data inputted from the data memory 12 to the calculating unit 10A, and then the calculating unit 10G executes the calculation conditionally according to the result of the calculation executed in the calculating unit 10D.

It is also assumed in the operation example described above that an output value "0" is set as an address "0" of the memory 1001 in the calculating unit 10D, and that an output value "1" is set as an address "0" of the memory 1001 in the calculating unit 10G. In this example, the calculating unit 10D executes a calculation according to the circuit information read from the circuit-information storage unit 101 always using the value "0" indicated by the direct-instruction address bus 13 as an address, regardless of the calculation result of the calculating unit 10A. Meanwhile, the calculating unit 10G executes a calculation conditionally according to the calculation result of the calculating unit 10A.

A modification of the semiconductor device according to the present embodiment is explained below. In the semiconductor device 1 according to the present embodiment, calculations of three stages need to be executed in turn in one cycle. That is, calculations are executed first by the calculating units 10A to 10C, then calculations are executed conditionally by the calculating units 10D to 10F according to results of the calculations by the calculating units 10A to 10C, and then calculations are executed conditionally by the calculating unit 10G to 10I according to results of the calculations by the calculating units 10D to 10F. Accordingly, a time period of one cycle in the semiconductor device 1 needs to be sufficiently long. However, when the time period of one cycle is long, performance of the semiconductor device 1 is deteriorated. To solve this problem, the calculating units 10A to 10I in a semiconductor device 1' according to a modification of the present embodiment execute calculations in a pipeline manner.

Figure 11:
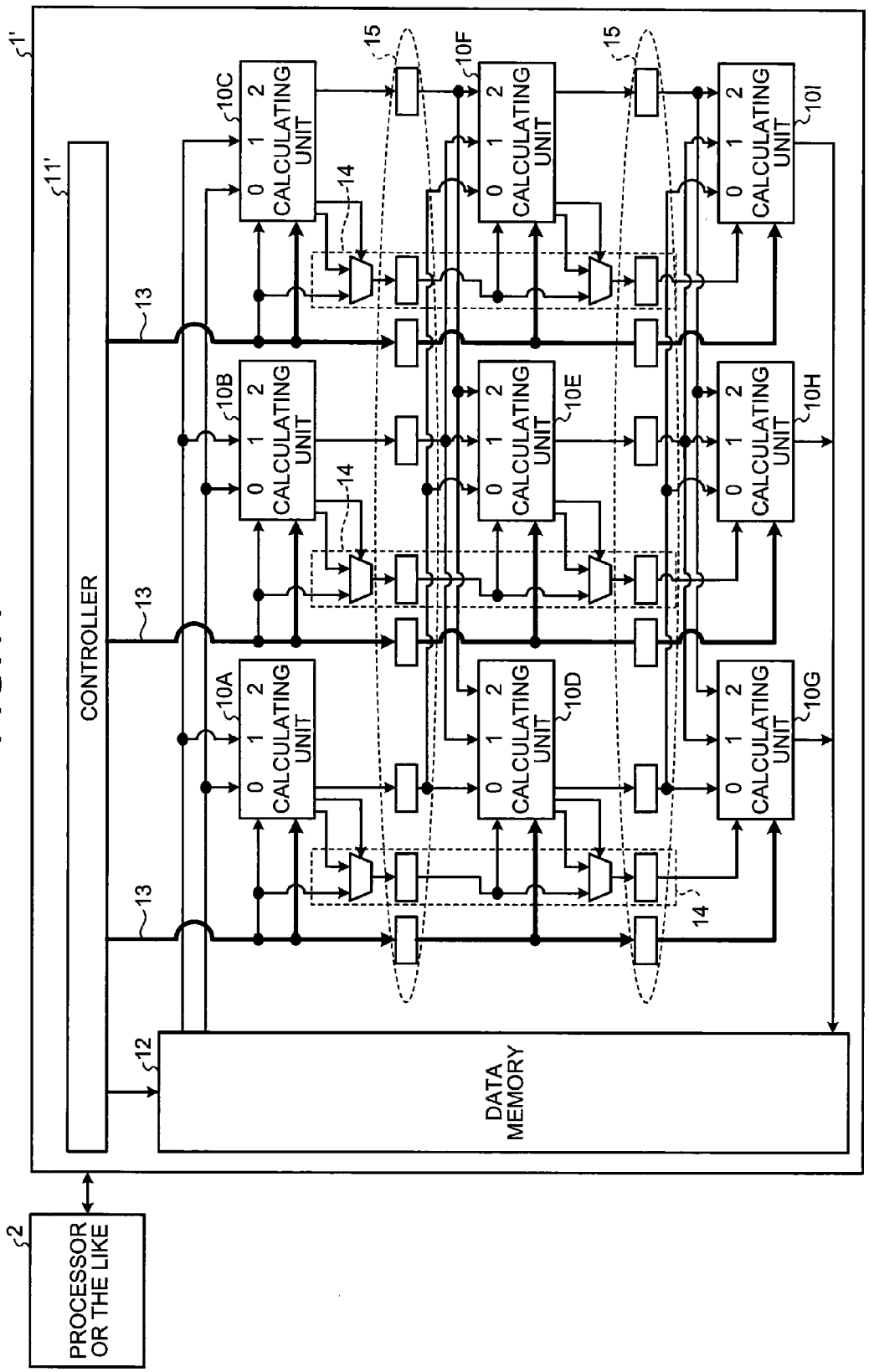
FIG. 11 is a block diagram of a modification of the semiconductor device.
Figure 12:
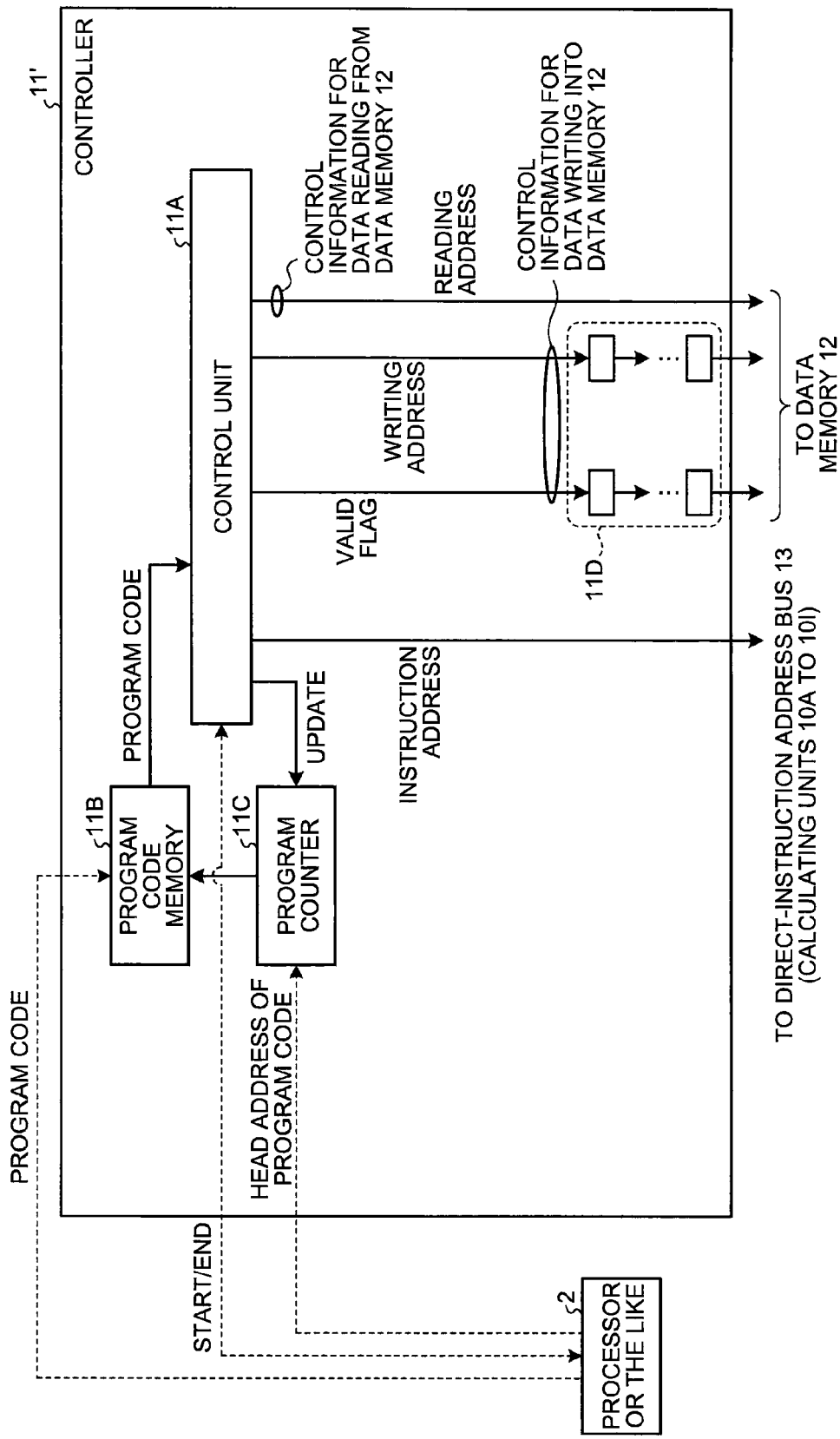
FIG. 12 is a block diagram of a modification of the controller.

As shown in FIG. 11, the semiconductor device 1' includes the nine calculating units 10A to 10I, a controller 11', the data memory 12, the direct-instruction address bus 13, the indirect-instruction address bus 14, and plural timing latches 15. As shown in FIG. 12, the controller 11' includes the control unit 11A, the program code memory 11B, the program counter 11C, and plural timing latches 11D.

The timing latches 15 are provided at outputs of the direct-instruction address bus 13, the indirect-instruction address bus 14, and the calculating units 10A to 10I, to enable the calculating units 10A to 10I to execute calculations in a pipeline manner. A storage element, such as a flip-flop, the output of which varies according to clocks is used as the timing latch 15.

The timing latches 11D are provided in the middle of lines for transmitting control information (a writing address and a valid flag) for writing data from the controller 11' to the data memory 12. The timing latches 11D enable the control information (the writing address and the valid flag) for the data writing to be transferred from the controller 11' to the data memory 12 in a pipeline manner. A storage element, such as a flip-flop, the output of which varies according to clocks is used as the timing latch 11D.

The number of the timing latches 15 is 18 in FIG. 11. However, the number of the timing latches 15 can be properly changed according to circuit designs, such as the number of calculating units 10. Similarly, the number of the timing latches 11D shown in FIG. 12 can be properly changed according to circuit designs.

In the semiconductor device 1' shown in FIG. 11, a value set by the calculating unit 10 in the indirect-instruction address bus 14 in a cycle, or a result of a calculation outputted from the calculating unit 10 is not transmitted in that cycle to another calculating unit 10 of the subsequent stage that is connected with the calculating unit 10, but instead transmitted to another calculating unit 10 of the subsequent stage in the next cycle. Accordingly, one cycle in the semiconductor device 1' needs only to be long enough for the calculating unit 10 to execute one calculation. Therefore, in an ideal case, one cycle in the semiconductor device 1' can be reduced to one third of the time period of one cycle in the semiconductor device 1 explained with reference to FIG. 1.

In the semiconductor device 1' shown in FIG. 11, the calculating units 10A to 10I execute calculations in a pipeline manner. Therefore, the number of cycles required to perform one data process is three times as large as the number of cycles in the semiconductor device 1 explained with reference to FIG. 1. Therefore, time required to perform one data process does not change. However, the number of cycles required to perform two data processes consecutively in a pipeline manner is only one larger than the number of cycles required to perform one data process. When two or more data processes are consecutively performed in this way, the semiconductor device 1' shown in FIG. 11 achieves higher performance than the semiconductor device 1 shown in FIG. 1.

On the other hand, the semiconductor device 1' shown in FIG. 11 has a larger area than the semiconductor device 1 shown in FIG. 1 by the incorporated storage elements (the timing latches). Therefore, it is necessary to carry out an appropriate embodiment according to needs for performance or area required for the semiconductor device.

As described above, with the semiconductor device according to the present embodiment, a result of a calculation executed by a reconfigurable circuit can be used by another reconfigurable circuit as an address for reading circuit information from a memory. Accordingly, the mechanism in which conditional executions are performed in plural reconfigurable circuits under conditions of different calculation results, respectively, can be realized only by using fewer reconfigurable circuits than the conventional technology. Therefore, more conditional executions can be performed in parallel, and thus conditional executions in the reconfigurable circuits can be performed more speedily.

According to the present invention, conditional executions in a reconfigurable circuit can be performed more speedily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor device comprising:
   a first circuit that is dynamically reconfigurable, and executes a first calculation;
   a second circuit that is dynamically reconfigurable, includes a first storage unit therein, and executes a second calculation;
   a controller that outputs a first address to the first circuit and the second circuit, and controls input of data into the first circuit, the first address being a value for specifying a first execution circuit for the first calculation and a second execution circuit for the second calculation; and a bus that transfers a result of the first calculation executed by the first circuit to the second circuit, wherein the first circuit executes the first calculation with respect to first input data into the first circuit by means of the first execution circuit configured based on the first address, and outputs the result of the first calculation to the bus, and the second circuit selects the first address or the result of the first calculation based on information stored in the first storage unit addressed by the first address, configures the second execution circuit based on the selected one from the first address and the result of the first calculation, executes the second calculation with respect to second input data into the second circuit by means of the second execution circuit, and outputs a result of the second calculation.

2. The device according to claim 1, wherein the second circuit specifies the second execution circuit based on the first address when the first information has a first value, and specifies the second execution circuit based on the result of the first calculation when the first information has a second value.

3. The device according to claim 1, wherein the second circuit further includes a second storage unit, and determines whether to output the result of the second calculation to the bus based on second information stored in the second storage unit and specified by one of the first address and the result of the first calculation.

4. The device according to claim 3, wherein the second circuit outputs the result of the second calculation to the bus when the second information has a third value, and does not output the result of the second calculation to the bus when the second information has a fourth value.

5. The device according to claim 1, wherein the second circuit outputs the second input data together with the result of the second calculation when outputting the result of the second calculation to the bus.

6. The device according to claim 1, wherein the controller, the first circuit, and the second circuit are connected to each other in a pipeline manner, and the first address and the result of the first calculation are transferred in a pipeline manner.

7. The device according to claim 1, further comprising a third circuit that is connected to the second circuit and executes a third calculation, wherein the bus transfers one of the results of the first calculation and the second calculation to the third circuit, and the third circuit executes a calculation with respect to third input data into the third circuit, by means of a third execution circuit for the third calculation and specified by one of the first address outputted from the controller and the result of one of the first calculation and the second calculation read from the bus, based on third information stored in a third storage unit included in the third circuit and specified by the first address outputted from the controller, and outputs a result of the third calculation.

8. A data processing method performed by a semiconductor device that includes a first circuit being dynamically reconfigurable, a second circuit being dynamically reconfigurable and including a storage unit therein, a controller, and a bus, the method comprising:

first outputting by the controller of outputting a first address addressing an area of the storage unit to the first circuit and the second circuit;

controlling by the controller of controlling input of data into the first circuit;

first calculating by the first circuit of executing the first calculation with respect to first input data into the first circuit by means of a first execution circuit for the first calculation and configured based on the first address;

transferring by the first circuit of transferring a result of the first calculation executed in the first calculating to the second circuit via the bus;

selecting by the second circuit of selecting the first address or the result of the first calculation based on information stored in the area of the storage unit;

configuring by the second circuit of configuring a second execution circuit for the second calculation based on selected one from the first address and the result of the first calculation;

second calculating by the second circuit of executing the second calculation with respect to second input data into the second circuit by means of the second execution circuit; and second outputting by the second circuit of outputting a result of the second calculation executed in the second calculating.

* * * * *